US006013978A

United States Patent [19]

Donofrio

[11] Patent Number: 6,013,978

[45] **Date of Patent: *Jan. 11, 2000**

[54] METHOD FOR PRODUCING PHOSPHOR SCREENS, AND COLOR CATHODE RAY TUBES INCORPORATING SAME

[75] Inventor: Robert L. Donofrio, Ann Arbor, Mich.

[73] Assignee: U.S. Philips Corporation, New York, N.Y.

[ * ] Notice: This patent is subject to a terminal disclaimer.

[21] Appl. No.: 08/916,109

[22] Filed: Aug. 21, 1997

Related U.S. Application Data

[60] Continuation of application No. 08/430,978, Apr. 28, 1995, abandoned, which is a division of application No. 08/207,502, Mar. 8, 1994, abandoned.

[51] Int. Cl.[7] .......................... H01S 29/10; H01J 29/10; H01J 31/00; H01J 5/16

[52] U.S. Cl. .................... 313/461; 313/466; 313/477 R; 313/479; 313/473; 313/474; 313/110; 313/112; 313/113

[58] Field of Search .................................. 313/461, 474, 313/466, 469, 473–74, 477 R, 479–80, 489, 110, 112, 113; 250/365

[56] References Cited

U.S. PATENT DOCUMENTS

| | | | |
|---|---|---|---|
| 3,140,176 | 7/1964 | Hoffman . | |
| 3,146,368 | 8/1964 | Fiore et al. . | |
| 3,801,817 | 4/1974 | Goodman | 250/365 |
| 3,953,621 | 4/1976 | Donofrio . | |
| 4,070,596 | 1/1978 | Tsuneta et al. . | |
| 4,507,585 | 3/1985 | Inoue et al. | 313/471 |
| 4,633,131 | 12/1986 | Khurgin | 313/474 |
| 4,634,926 | 1/1987 | Vriens et al. | 313/474 |
| 4,755,716 | 7/1988 | Hayafune et al. | 313/478 |
| 4,770,962 | 9/1988 | Brennesholtz | 427/68 |
| 4,804,884 | 2/1989 | Vriens et al. | 313/474 |
| 4,828,949 | 5/1989 | Kato et al. | 427/68 |
| 4,917,978 | 4/1990 | Ritt et al. | 427/68 |
| 4,921,727 | 5/1990 | Datta et al. | 427/68 |
| 4,973,495 | 11/1990 | Koike et al. | 427/68 |
| 4,990,824 | 2/1991 | Vriens et al. | 313/474 |
| 5,030,882 | 7/1991 | Solero | 313/478 |
| 5,068,568 | 11/1991 | de Vrieze et al. | 313/474 |
| 5,089,743 | 2/1992 | Okuda et al. | 313/474 |
| 5,179,318 | 1/1993 | Maeda et al. | 313/466 |
| 5,340,673 | 8/1994 | Tateyama et al. | 427/64 |
| 5,569,977 | 10/1996 | Donofrio | 313/486 |

FOREIGN PATENT DOCUMENTS

| | | | |
|---|---|---|---|
| 285224 | 10/1988 | European Pat. Off. | 313/474 |

OTHER PUBLICATIONS

J. Electrochem. Soc., vol. 130, No. 8, pp. 1767–1771, Aug. 1983, by L. Grimm et al.

*Primary Examiner*—Nimeshkumar D. Patel
*Assistant Examiner*—Mack Haynes
*Attorney, Agent, or Firm*—Norman N. Spain

[57] ABSTRACT

Adherence of the phosphor screen to the face panel of a color cathode ray tube is improved by placing a UV-reflective filter on the inside of the face panel prior to photolithographic forming of the screen, in order to reflect transmitted UV light back onto those areas from which the light emerged, thereby effectively increasing the exposure dosage of those areas.

5 Claims, 7 Drawing Sheets

METHOD FOR PRODUCING PHOSPHOR SCREENS, AND COLOR CATHODE RAY TUBES INCORPORATING SAME

CROSS REFERENCE TO RELATED APPLICATIONS

This Application is continuation of U.S. application Ser. No. 08/430,978, now abandoned, filed on Apr. 28, 1995 which is divisional of U.S. application Ser. No. 08/207,502, now abandoned, filed on Mar. 8, 1994.

BACKGROUND OF THE INVENTION

This invention relates to phosphor screens for color cathode ray tube (CRT's), and more particularly relates to a method for increasing the adherence of such screens to the face panels of the tubes, and to tubes incorporating such screens.

In producing color CRT's for color television and allied display applications, it is customary to form the phosphor screen photolithographically by forming three interlaced patterns of phosphor elements, one for each of the primary colors red, blue and green. This is accomplished by successively exposing and developing three photoresist layers, each containing a different color phosphor, using a single photomask and a single light source. For each exposure, the light source is moved, resulting in three different beam landing areas for each aperture of the photomask. See, for example, U.S. Pat. Nos. 3,140,176; 3,146,368 and 4,070,596.

In forming such phosphor screens, it is known that too little light during exposure results in incomplete polymerization of the photoresist in the phosphor layer, and consequent poor adhesion of the phosphor elements to the face plate of the tube. As beam landing areas become smaller to accommodate the finer pitch screens of present interest for high resolution displays such as computer displays and high definition television displays, it becomes increasingly difficult to produce screens having adequate adhesion. Increasing the intensity of the light source to improve adhesion often results in the unintentional enlargement of the phosphor elements due to spontaneous polymerization beyond the exposed areas.

In U.S. pat. No. 3,953,621, adhesion of color CRT phosphor screens is improved by increasing the exposure dosage without increasing the intensity of light from the source. This is accomplished by providing a mirror to reflect light transmitted through the phosphor-photoresist layer and the face panel back onto the layer. However, the reflected light tends to scatter beyond the beam landing areas from which it emerged, resulting in relatively little additional exposure in these areas, as well as the undesired exposure of adjacent areas, causing a condition known as “poor wash”.

Poor wash occurs because the adjacent areas become insolubilized by the unintentional exposure, and thus cannot be removed by development. The residual phosphor contaminates these areas and consequently leads to degradation of color purity of the resultant display.

In addition, the light which is reflected back to the desired beam landing areas can be of reduced intensity due to losses such as reflection at the panel surfaces and absorption by the panel itself. The absorption loss can be especially significant, since the transmission of the panel is often intentionally reduced (e.g., from 85% to 52% or even 31%) in order to increase display contrast.

OBJECTS AND SUMMARY OF THE INVENTION

Accordingly, it is an object of the invention to improve the adherence of the phosphor screen to the face panel of color CRT's.

It is another object of the invention to improve such adherence without increasing the intensity of the light source used to photolithographically form the screen.

It is another object of the invention to improve such adherence without scattering light beyond the intended beam landing areas.

It is another object of the invention to improve adherence to enable the production of fine pitch screens.

It is another object of the invention to improve adherence without passing light through the face panel.

In accordance with the invention, there is provided a method for producing a phosphor screen for a color cathode ray tube, the method comprising photolithographically disposing an array of phosphor elements of at least two alternating colors on the interior surface of the tube's face panel, the array being formed by passing light through an adjacent aperture mask to expose portions of photosensitive phosphor layers on the face panel corresponding to the aperture array, and developing the layers to remove the unexposed portions, characterized in that prior to formation of the phosphor layers, a UV-reflective filter is formed on the interior surface of the face panel so that during exposure, UV light is reflected back onto those portions of the layers from which such light was transmitted, whereby the exposure dosage of the layers is effectively increased.

In accordance with another aspect of the invention, there is provided a color CRT incorporating a UV-reflective filter layer on the inner surface of the tube's face panel, under the phosphor screen.

DESCRIPTION OF THE PREFERRED EMBODIMENTS

Currently, most of the color CRTs for color television employ phosphor screens composed of an array of vertically oriented alternating red, blue and green stripes of phosphor material. The stripes are all formed photolithographically through a single aperture mask having vertically elongated slot-shaped apertures oriented in vertical rows.

In the photolithographic process employed, an aqueous photoresist material, such as polyvinyl alcohol sensitized with a dichromate, which becomes insoluble in water upon exposure to light, is exposed through the mask, and then developed by washing with water to remove the unexposed portions and leave the exposed pattern. By employing an elongated light source having a length several times that of a single aperture, the shadows cast by the bridges of mask material between the vertically adjacent apertures are almost completely eliminated, resulting in a pattern of continuous vertical stripes. In addition, by making multiple exposures, a single aperture row can result in multiple stripes.

Figure 1:
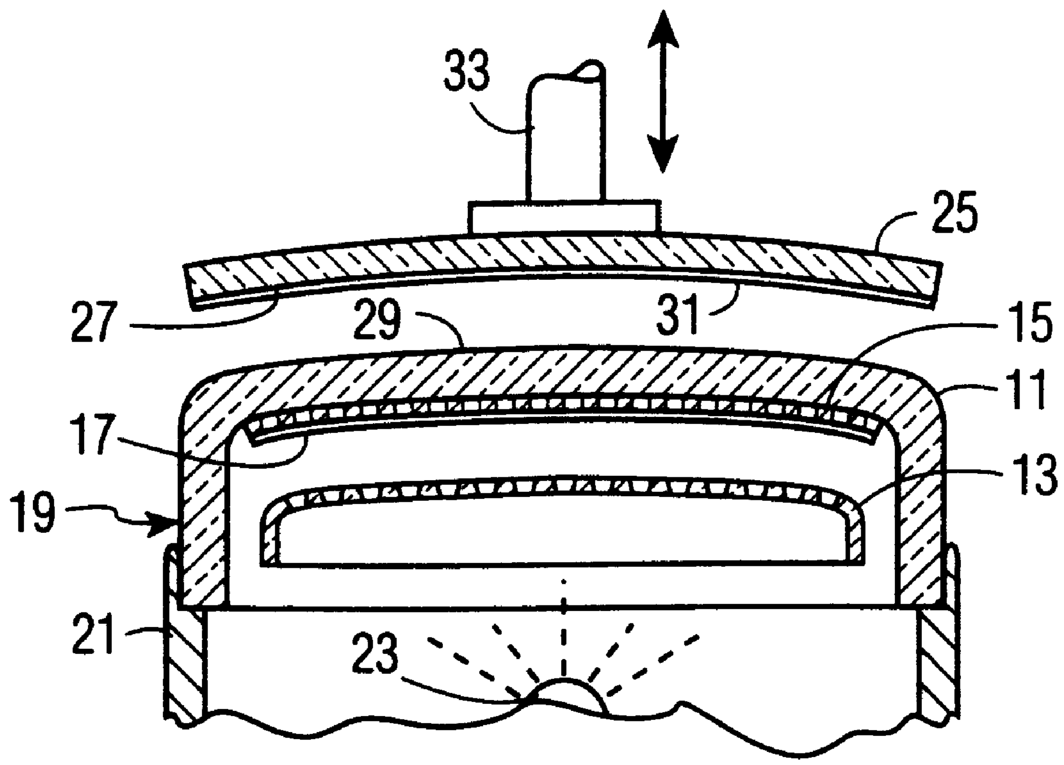
FIG. 1 is a cross-section view showing the mask-panel assembly of a color cathode ray tube positioned on a light exposure apparatus, with a reflecting surface positioned above the assembly.
Figure 2A:
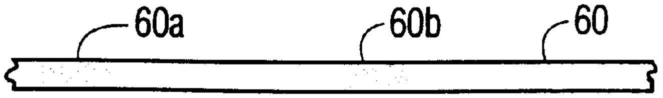
FIGS. 2(*a*) through (*l*) are diagrams representing the steps of the photolithographic process used to produce phosphor screens according to a preferred embodiment of the invention.
Figure 2B:
Figure 2C:
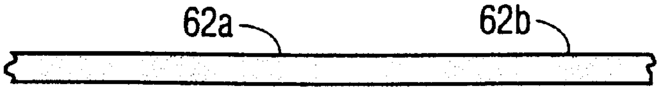
Figure 2D:
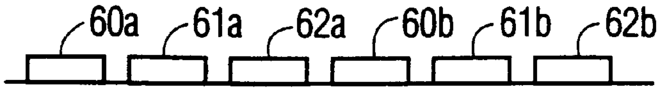
Figure 2E:
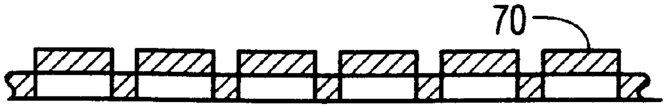
Figure 2F:
Figure 2G:
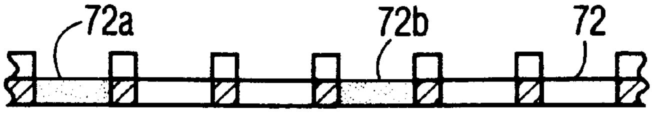
Figure 2H:
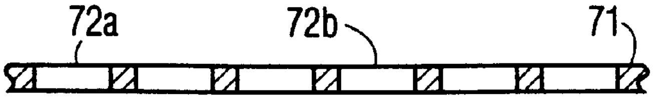
Figure 2I:
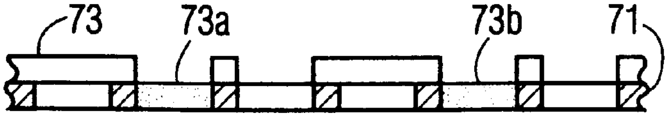
Figure 2J:
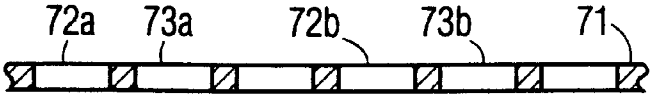
Figure 2K:
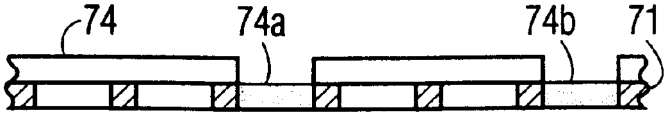
Figure 2L:
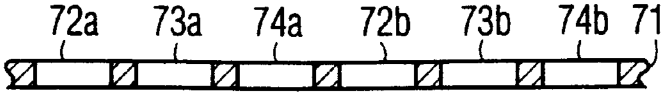
Figure 3:
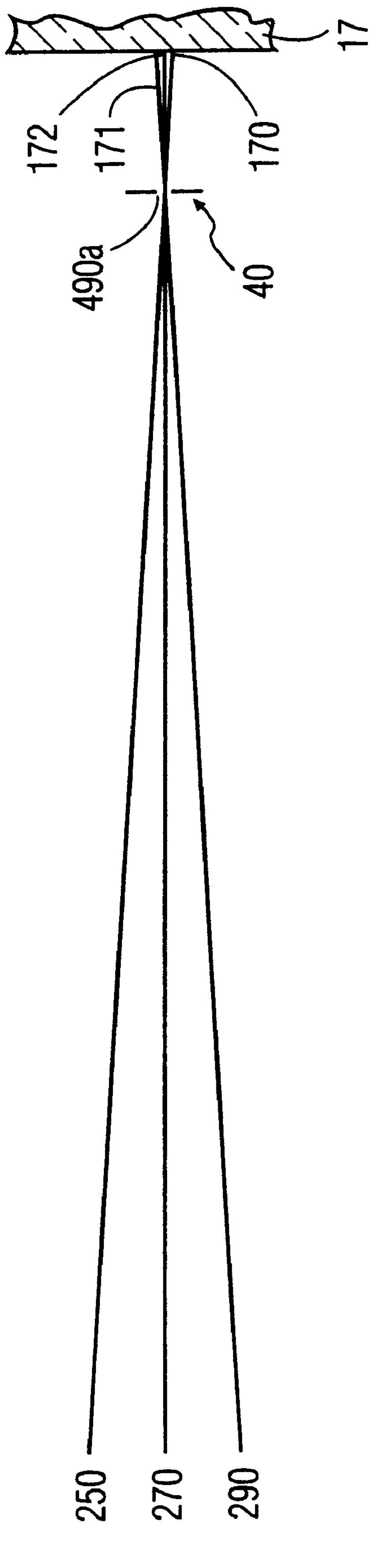
FIG. 3 is a diagram representing ray traces through a mask aperture in the apparatus of FIG. 1.

Referring now to FIG. 1, there is illustrated a face panel 11 of a color cathode ray tube having an aperture mask 13 positioned adjacent to the face panel 11 by means not shown. An opaque matrix 15, disposed on the interior surface of the viewing area of the face panel 11, defines windows corresponding to the apertures of the mask 13. A coating 17 of a negative photoresist material and particles of an associated phosphor is disposed over matrix 15 in preparation for the formation of one set of pattern elements comprising the patterned screen structure. As shown, the mask panel assembly 19 is positioned on an optical exposure apparatus 21 including light source 23 for exposing the coating 17 through the apertures in the mask over the window areas of the matrix. As illustrated in FIG. 3, movement of the light source to three different locations, indicating by the three ray traces 250, 270 and 290, results in three different stripes 170, 171, and 172, through a single aperture row 40*a* in mask 40.

Positioned above the panel 11 is a substrate member 25 having surface 27 facing the panel, which is contoured to correspond with the exterior contour 29 of the panel. Disposed on the surface 27 is a layer 31 of a light reflective medium. In U.S. Pat. No. 3,953,621, this layer 31 is preferably continuous and may be formed, for example, by vapor deposition of a reflective material such as aluminum, silver, or rhenium.

Substrate movement means 33 enables positioning of the reflective medium against the exterior surface of the panel 11 prior to exposure and removal therefrom after exposure, such movement being necessitated to facilitate placement and removal of the panels for exposure. While vertical movement is shown, other forms such as angular movement, eg., a side oriented hinge, may also be appropriate.

As is known, color screens for color CRTs can be made either with or without a light absorbing matrix surrounding the phosphor elements. Such a matrix is generally used to improve contrast and/or brightness of the image display.

Referring now to FIG. 2, a cross-sectional portion of the screen is depicted during the various steps of a preferred embodiment of the photolithographic process in which prior to the formation of the phosphor array, a light-absorbing matrix is first formed by successively exposing a single photoresist layer 60 to a source of actinic radiation from three different locations through the mask, to result in insolubilized portions 60*a* and 60*b*, 61*a* and 61*b*, and 62*a* and 62*a* (FIGS. 2(*a*), 2(*b*) and 2(*c*)). The exposed resist is then developed to remove the unexposed portions and leave an array of photoresist elements corresponding to the contemplated phosphor pattern array (FIG. 2(*d*)). Next, a light-absorbing layer 70 is disposed over the array, (FIG. 2(*e*)), and the composite layer is developed to remove the photoresist array and overlying light-absorbing layer, leaving a matrix 71 defining an array of windows corresponding to the contemplated phosphor pattern array (FIG. 2(*f*)). Because the exposed resist is insoluble in water, a special developer is required for this step, such as hydrogen peroxide or potassium periodate, as is known.

Next, phosphor layers are formed over the windows as follows. First, a layer of a red phosphor and photoresist 72 is disposed over the matrix layer 71 and exposed (FIG. 2(*g*)), and developed to result in red elements 72*a* and 72*b* (FIG. 2(*h*)). This procedure is then repeated for the blue and green phosphors (FIGS. 2(*i*) through (*l*)) to result in the phosphor array having alternating red (72*a* and *b*), blue (73*a* and *b*), and green (74*a* and *b*) stripes.

Figure 4:
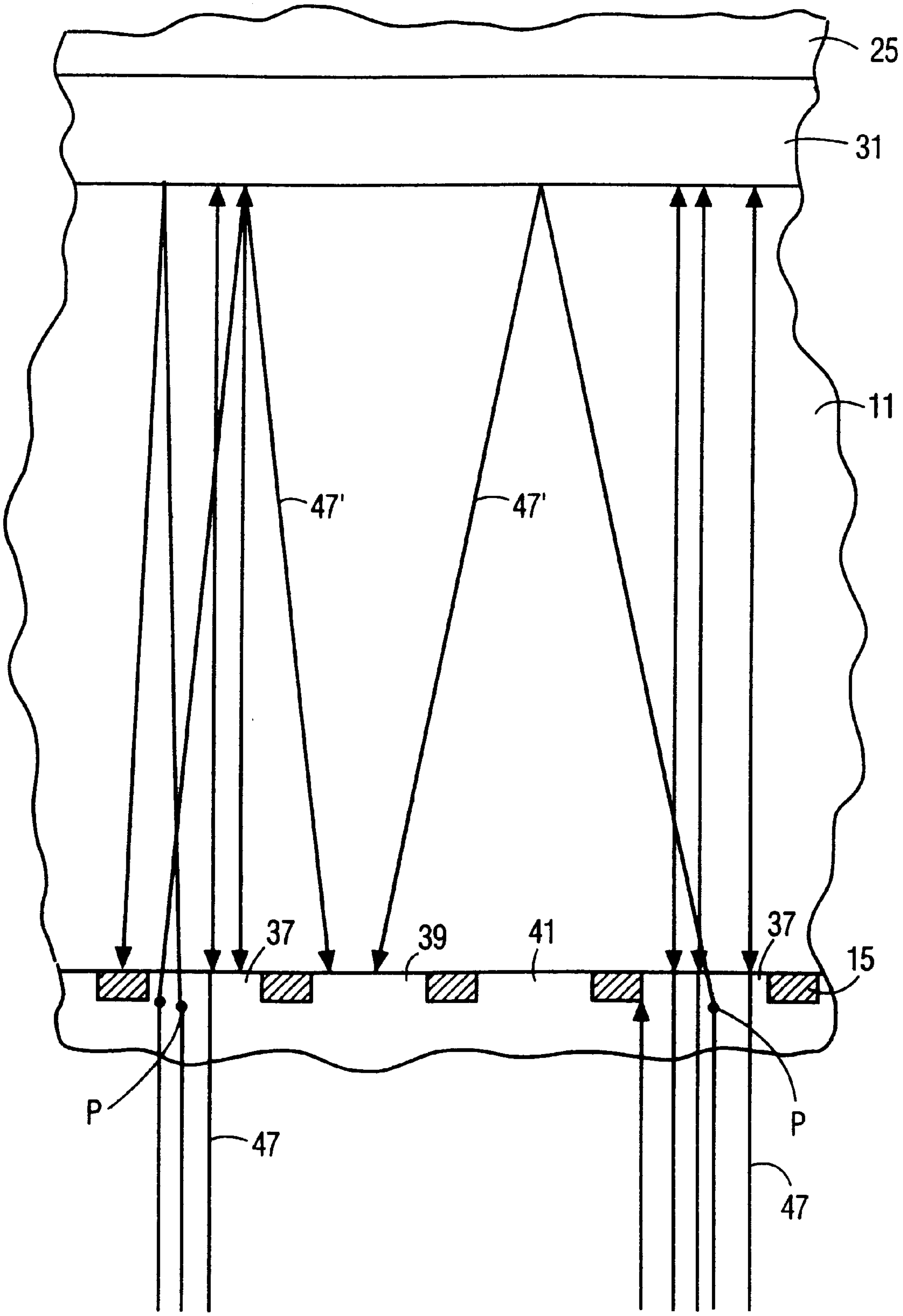
FIG. 4 PRIOR ART
FIG. 4 is a sectional enlargement illustrating a portion of the panel and associated reflective surface of FIG. 1.

FIG. 4 shows an enlarged portion of the panel 11, the associated matrix 15 and coating 17, and the contiguous reflective medium 31. Pattern elements 37 of the screen structure are being exposed in coating 17. Pattern elements 39 and 41 respectively, have been previously disposed between respective window areas of matrix 15. The third pattern areas 37 are receiving rays 47 of light that have traversed the mask apertures, not shown, to effect desired polymerization of the photoresist. A portion of the rays 47 traverse the phosphor and associated coating, while others are randomly scattered from points p within the coating. Those rays which traverse the panel 11, are reflected back by reflective medium 31, thereby producing reflected rays 47'. Depending upon the angle of incidence of rays 47 on medium 31, the reflected rays 47' strike areas 37 to enhance the exposure of those areas, or may land on matrix 15 or on adjacent areas 39 and 41, leading to a condition known as "poor wash". That is, during development, portions of these adjacent areas remain to contaminate the other phosphor colors, leading to a degradation in color purity of the resultant display image.

Figure 5:
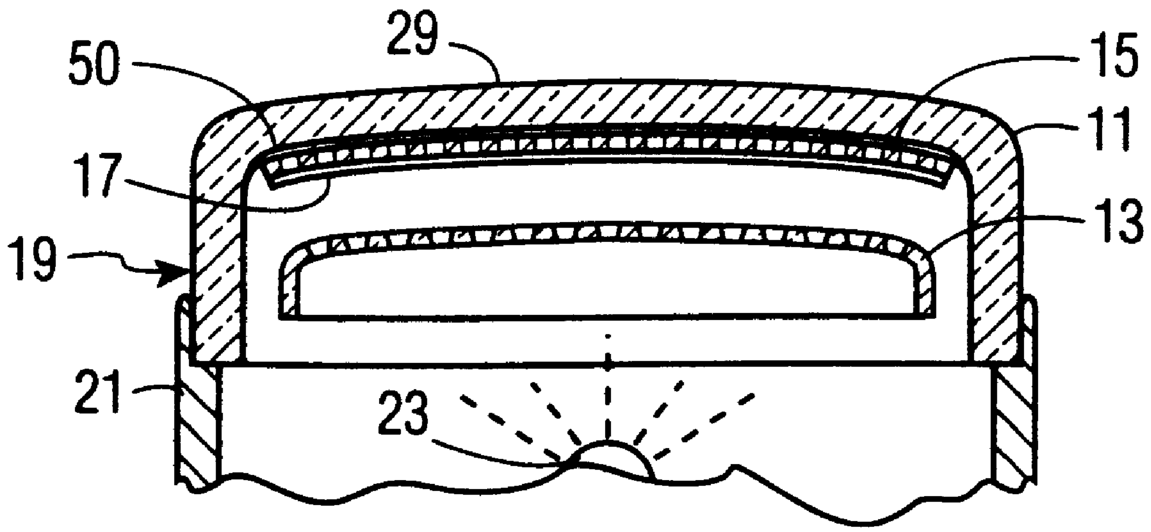
FIG. 5 is a cross-section view similar to that of FIG. 1, in which a UV-reflective surface has replaced the reflective surface.

Referring now to FIG. 5, there is shown a mask-panel assembly similar to that of FIG. 1, except that in accordance with the invention, reflective surface 31 has been replaced by UV-reflective filter layer 50, on the inner surface of face panel 11, under the matrix 15 and coating 17.

Figure 6:
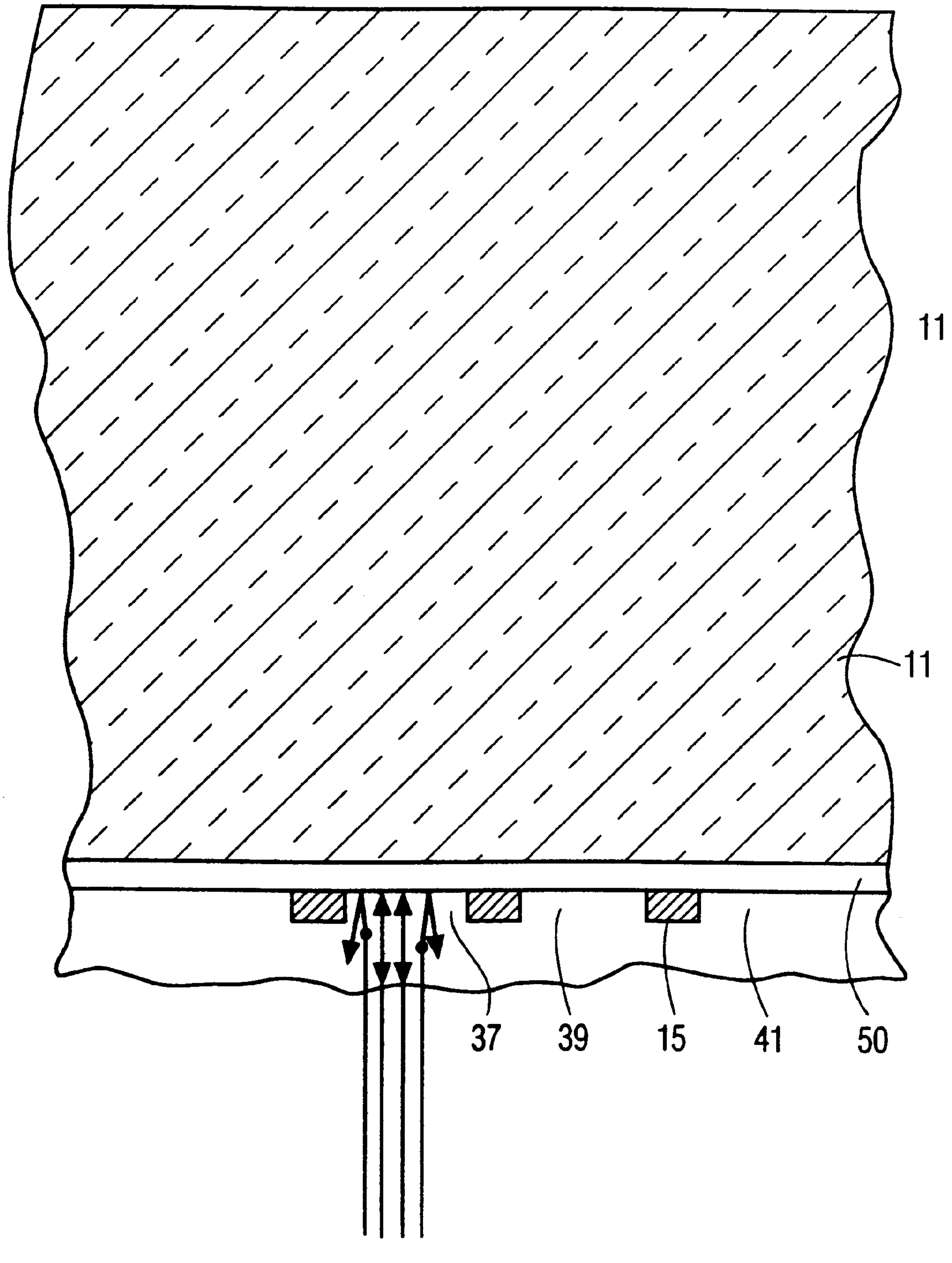
FIG. 6 is a further sectional enlargement similar to that of FIG. 4, showing one phosphor element in association with a UV-reflective surface which has replaced the reflective surface of FIG. 1.

Referring now to FIG. 6, an enlargement of the cross-section of FIG. 5 showing one area 37 and portions of adjacent areas 39 and 41 of coating 17, and the UV-reflective filter 50, which is located directly on the inner surface of face panel 11. Due to the fact that the reflective surface 50 is also in contact with layer 17, most of the scattered UV rays are returned to the area 37, while some will be absorbed by the adjacent matrix 15. This condition has the beneficial result of enhancing exposure of area 37, thus improving the adherence of the phosphor element to the surface of the face panel 11. In addition, this condition prevents the spurious landing of scattered UV rays on adjacent areas 39 and 41, thus reducing the occurrence of poor wash.

An added advantage of placing filter 50 on the inner surface of the face panel is that absorption and reflection losses due to the panel are avoided, further enhancing exposure of area 37.

Such enhanced exposure also makes possible finer pitch screens, due to the improved adherence.

In one embodiment of the invention, a simple UV-reflective filter comprises alternating layers of high and low refractive index materials, for example, $TiO_2$ as the high index layer and $SiO_2$ as the low index layer. Techniques for designing and forming such filters are well known and are described, for example, in *Thin-Film Optical Filters*, by H. A. MacLeod, MacMillan, N.Y., 1985, Adam Hilger, Ltd.

Figure 7:
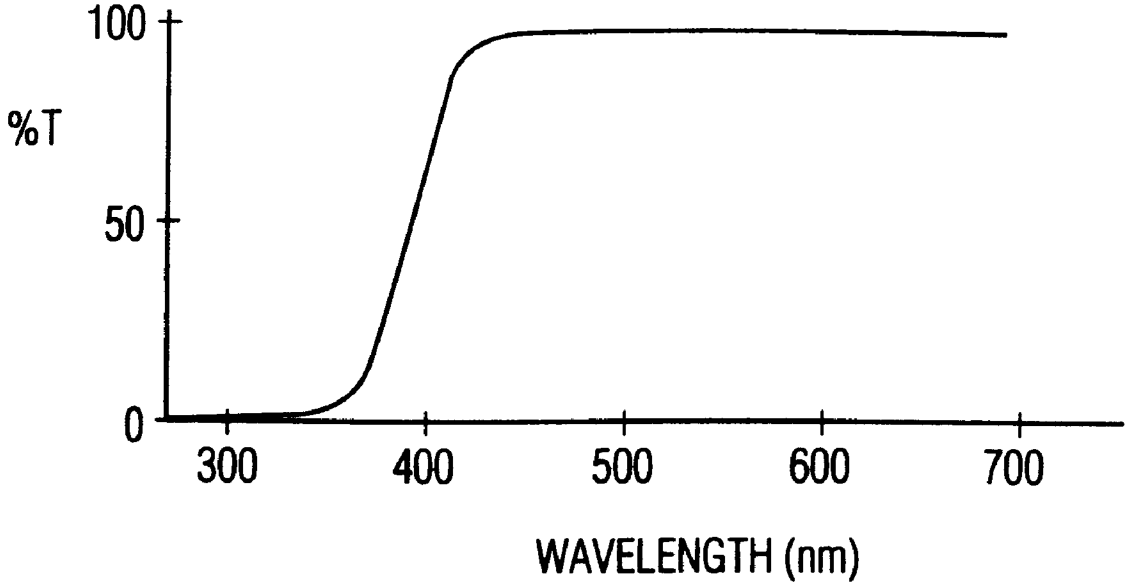
FIG. 7 is a plot of percent transmission (%T) versus wavelength (nm) of a UV-reflective filter suitable for use in the method of the invention.

A typical filter, also known as a high pass filter, would have 22 layers in the pattern design, beginning at the inner surface of the display panel 0.125H, 0.25L, 0.25H, (0.25L, 0.25H)*8, 0.25L, 0.25H, 0.25L, where H is $TiO_2$, L is $SiO_2$ and the numerical coefficients indicate optical thickness, nd, where n is the refractive index and d is the physical thickness of the layer. A calculated transmission vs. wavelength characteristic of such a filter is shown in FIG. 7. As may be seen, such a filter would be substantially transmissive in the visible region of the spectrum, i.e., above 400 nm, and substantially reflective in the UV region, below 400 nm. Actual filters may show a small amount of absorption. A typical method of forming such a filter is by vapor deposition, although other techniques are also possible.

It is known that the high intensity mercury lamp typically used to expose the phosphor/photoresist mixture in layer 17 has significant emissions in the UV portion of the spectrum, and that the ammonium dichromate sensitizer typically used in the photoresist absorbs significant amounts of this UV radiation. See, for example, L. Grimm et al., J. Electrochem. Soc., Vol. 130, No. 8, p. 1768, August 1983. Thus, when a UV reflective filter is formed on the inner surface of the face panel of the CRT prior to formation of the phosphor layers as described above, UV light which passes from the mercury lamp through the phosphor/photoresist layers during exposure, is substantially reflected by the filter back into the layer, where it can enhance exposure of the photoresist, leading to increased adherence of the phosphor/photoresist layers, without the necessity of increasing the intensity of the mercury lamp.

The invention has necessarily been described in terms of a limited number of embodiments. However, other embodiments and variations of embodiments will be apparent to those skilled in the art, and these are intended to be encompassed within the scope of the appended claims. For example, other sources which emit UV, such as mercury xenon, as well as other photoresists which absorb UV radiation, such as diazo-sensitized photoresists, may be used.

What is claimed is:

1. A color cathode ray tube, comprising a face panel and a phosphor screen on the face panel, characterized in that a UV-reflective filter layer is present on the interior surface of the face panel, and the phosphor screen is present on the filter layer; wherein, the UV-reflective filter layer transmits substantially all visible light.

2. The tube of claim 1 in which the UV-reflective visible light filter transmissive layer comprises alternating layers of high and low refractive index material.

3. The tube of claim 2 in which the high refractive index material is $TiO_2$ and the low refractive index material is $SiO_2$.

4. The tube of claim 2 in which there are 22 layers.

5. The tube of claim 4 in which the layers are in the pattern, beginning at the inner surface of the face panel: 0.125H, 0.25L, 0.25H, (0.25L, 0.25H) *8, 0.25L, 0.25H, 0.25L, where H is $TiO_2$, L is $SiO_2$, and the numerical coefficients indicate optical thickness, nd, where n is the refractive index and d is the physical thickness of the layer.

* * * * *